United States Patent [19]

Greskovich et al.

[11] 4,124,403

[45] Nov. 7, 1978

[54] HOT PRESSING OF SILICON NITRIDE USING BERYLLIUM ADDITIVE

[75] Inventors: Charles D. Greskovich, Schenectady; Svante Prochazka, Ballston Lake; Chester R. O'Clair, Latham, all of N.Y.

[73] Assignee: General Electric Company, Schenectady, N.Y.

[21] Appl. No.: 849,187

[22] Filed: Nov. 7, 1977

Related U.S. Application Data

[62] Division of Ser. No. 756,084, Jan. 3, 1977.

[51] Int. Cl.$^2$ ............................................. C04B 35/58
[52] U.S. Cl. ................................................. 106/73.5
[58] Field of Search .................... 264/65; 106/73.5, 55

[56] References Cited

U.S. PATENT DOCUMENTS

| 3,821,005 | 6/1974 | Layden | 106/73.5 |
| 3,830,652 | 8/1974 | Gazza | 106/73.5 |
| 3,835,211 | 9/1974 | Coe et al. | 264/66 |
| 3,836,374 | 9/1974 | Richerson et al. | 106/73.5 |
| 3,854,189 | 12/1974 | Ezis et al. | 423/344 |

FOREIGN PATENT DOCUMENTS 970,639  9/1964  United Kingdom .................... 106/73.5

Primary Examiner—O. R. Vertiz
Assistant Examiner—Mark Bell
Attorney, Agent, or Firm—Jane M. Binkowski; Joseph T. Cohen; Charles T. Watts

[57] ABSTRACT

A dense polycrystalline silicon nitride body is produced by hot-pressing a particulate mixture of silicon nitride and a beryllium additive.

5 Claims, 1 Drawing Figure

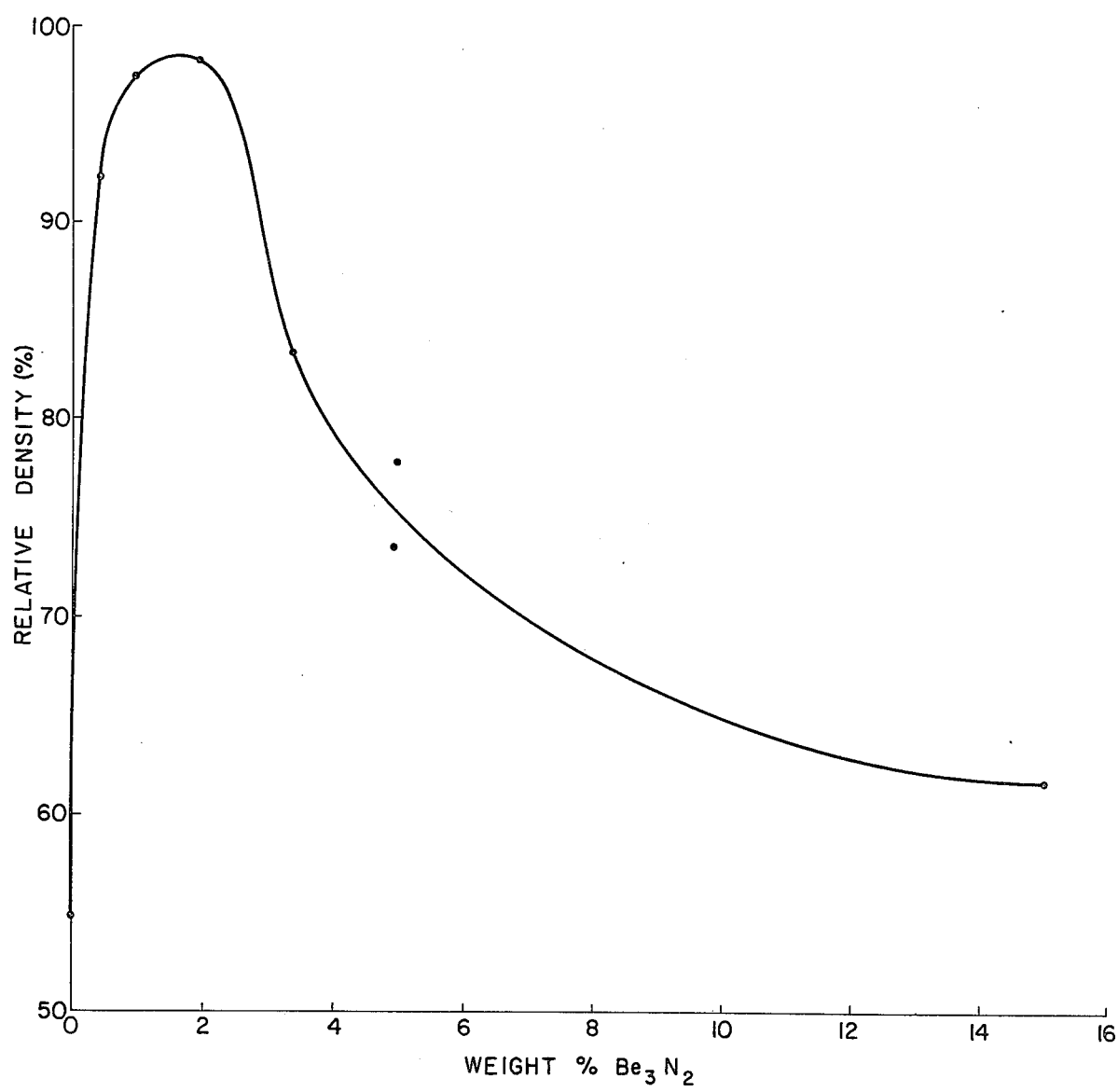

HOT PRESSING OF SILICON NITRIDE USING BERYLLIUM ADDITIVE

The invention herein described was made in the course of or under a contract or subcontract thereunder (or grant) with the Department of the Air Force.

This is a division of application Ser. No. 756,084, filed Jan. 3, 1977.

Silicon nitride is a choice candidate material for turbine applications because of its good high temperature strength and creep resistance, low thermal expansion coefficient and excellent oxidation resistance. So far, the conventional method of producing large specimens of dense silicon nitride is by hot-pressing with the help of an oxide flux, at temperatures greater than 1700° C. Various oxide fluxes or densification aids, such as MgO, $Y_2O_3$, $ZrO_2$ and $Ce_2O_3$, permit the attainment of full density in hot-pressed $Si_3N_4$. However, experience has shown that these oxide additions produce a silicate glass at grain boundaries which has a deleterious effect on the high temperature creep and strength properties due to the softening or melting of the glassy phase at temperatures ranging from about 1000° C. to 1200° C. depending on the oxide flux added. Consequently, most efforts to improve the high temperature properties of $Si_3N_4$ containing an oxide additive(s) have been directed towards improving the refractoriness of the silicate "glassy" phase by composition control and crystallization methods.

In accordance with the present process no oxide additive or flux is used. Also, at the grain boundaries of the present product there appears to be no detectable glassy phase.

The present invention is directed to hot-pressing homogeneous particulate dispersion of silicon nitride and a beryllium additive to produce a novel dense polycrystalline body of silicon nitride which substantially retains its room temperature mechanical properties at elevated temperatures ranging up to about 1400° C. or higher in air depending on the purity of the starting powder.

Those skilled in the art will gain a further and better understanding of the present invention from the detailed description set forth below, considered in conjunction with the figure, accompanying and forming a part of the specification, which is a graph showing relative densities of silicon nitride hot-pressed with beryllium nitride additions at 1750° C. for 20 minutes under a pressure of 8000 psi. The amount of beryllium nitride is based on the amount of silicon nitride. Specifically, the graph is a plot of the relative density of the hot-pressed silicon nitride body, i.e., the fractional density of the theoretical density of silicon nitride (3.18 g/cc) vs. the amount of $Be_3N_2$ admixed with the starting silicon nitride powder. The graph illustrates the present invention with amounts of beryllium nitride ranging from 0.2% by weight to 4% by weight, which corresponds to 0.1% to 2% by weight of elemental beryllium, respectively. From the shape of the curve it can be seen that beryllium nitride is an effective densifying additive, that as the beryllium nitride concentration increases up to about 2% by weight, which corresponds to about 1% by weight beryllium, the density of the hot-pressed body increases up to about 98%, and that amounts of beryllium nitride higher than about 2% by weight causes a fall in the density of the hot-pressed body to the point where 80% density is still attained at about 4% by weight beryllium nitride addition.

Briefly stated, the process of the present invention comprises providing a homogeneous particulate dispersion or mixture having an average particle size which is submicron of silicon nitride and a beryllium additive wherein the beryllium component is equivalent to from about 0.1% to about 2% by weight of elemental beryllium based on the amount of said silicon nitride, and hot-pressing said particulate dispersion in an atmosphere of nitrogen at a temperature ranging from about 1600° C. to about 1850° C. under a minimum pressure of about 2000 psi to produce a pressed body having a density of at least 80% of the theoretical density for silicon nitride.

The silicon nitride powder used in the present process may be amorphous or of the α-type or mixtures thereof. These powders can also contain β-silicon nitride usually in an amount up to about 20 weight % of the total amount of silicon nitride.

At present commercially available silicon nitride powder in any significant amount is formed by nitridation of silicon powder with the aid of catalysts which always leave CaO, $Fe_2O_3$, and $Al_2O_3$ as impurities in a significant amount, typically about 1 to 2%. Such a powder is not useful in the present process because when it is hot-pressed, even without an oxide flux, these impurities combine with $SiO_2$, which is inherently initially present in silicon nitride or forms on firing, to produce a low melting intergranular glassy phase.

In contrast, the present starting silicon nitride powder is substantially pure but it can range somewhat in purity. The necessary purity of the powder used depends largely on the temperatures and loads at which the final hot-pressed product will be used with the highest temperatures of use generally requiring the most pure powders. Specifically, with increasingly pure powder the resulting hot-pressed product increasingly retains its room temperature properties at high temperatures, i.e. the more stable are the mechanical properties of the hot-pressed product with increasing temperature.

The present silicon nitride powder may contain certain metallic and non-metallic impurities in a limited amount and these impurities are based on the total composition of the starting silicon nitride powder. Specifically, the powder should be free or substantially free of metallic impurities which react with $SiO_2$ or Si and $O_2$ to form low melting intergranular silicate glassy phase in a significant amount. Those impurities which form such a glassy phase include calcium, iron and aluminum and should not be present in a total amount greater than about 0.1% by weight. Also, the present silicon nitride powder may have an oxygen content ranging up to about 3% by weight. Normally, the oxygen is present in the form of silica. The amount of excess elemental silicon in the powder should not be present in an amount higher than about 4% by weight because appreciable amounts of residual elemental silicon may be retained in the product, depending on the extent of nitridation occurring during hot-pressing. Also, any elemental silicon present should be of submicron size and should be substantially homogeneously dispersed throughout the powder. Non-oxide impurities such as halogens which evaporate to a significant extent and which do not significantly deteriorate the properties of the hot-pressed silicon nitride body may also probably be present in amounts up to about 1% by weight of the starting silicon nitride powder.

To produce a hot-pressed product which has substantially stable mechanical properties at high temperatures, the preferred starting silicon nitride powder has a low oxygen content, i.e. usually about 2% or less by weight of the powder, and essentially free of elemental silicon. Also, it is free or substantially free of metallic impurities such as calcium, iron and aluminum, or may contain these metallic impurities in total amount ranging up to about 0.05% by weight of the powder. Such a powder can be synthesized. Alternatively, to reduce its oxygen content and also remove its vaporizable impurities, the silicon nitride powder can be calcined at a temperature ranging from about 1300° C. to about 1500° C. in a vacuum or in an atmosphere which has no significant deteriorating affect on the powder such as helium, nitrogen, hydrogen and mixtures thereof.

The present silicon nitride powder can be produced by a number of processes. For example, in one process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination yielding silicon nitride which usually contains oxygen and halogens at a 1% to 3% by weight level. The powder can also be synthesized in a plasma from silicon vapor and nitrogen.

Very pure silicon nitride powder can be formed by a process set forth in Ser. No. 756,241 filed of even date herewith in the names of Svante Prochazka and Charles D. Greskovich and assigned to the assignee hereof and which by reference is incorporated herein. Specifically, this copending application discloses reacting silane and an excess amount of ammonia above 500° C. and calcining the resulting solid at between 1100° C. to 1500° C. to obtain amorphous or crystalline silicon nitride.

In the present process the beryllium additive is selected from the group consisting of elemental beryllium, beryllium nitride, beryllium fluoride, beryllium silicon nitride and mixtures thereof. The known stoichiometric formulations for these additives are Be, $Be_3N_2$, $BeF_2$, and $BeSiN_2$, $Be_6Si_3N_8$, $Be_4SiN_4$, $Be_5Si_2N_6$, $Be_{11}Si_5N_{14}$, $Be_9Si_3N_{10}$. In the present process the beryllium additive is used in an amount so that its beryllium component is equivalent to from about 0.1% to about 2.0% by weight of elemental beryllium, and preferably from about 0.5% to about 1.0% by weight of elemental beryllium, based on the amount of silicon nitride. Amounts of the beryllium additive outside the range are not effective in producing the present hot-pressed body with a density of at least about 80%.

In carrying out the present process at least significantly or substantially uniform or homogeneous particulate dispersion, or mixture having an average particle size which is submicron of silicon nitride and beryllium additive is formed. Such a dispersion is necessary to produce a hot-pressed product with significantly uniform properties and having a density of at least 80%. The silicon nitride and beryllium additive powders, themselves, may be of a particle size which breaks down to the desired size in forming the dispersion but preferably the starting silicon nitride is submicron and the starting beryllium additive is less than 5 microns in particle size, and preferably submicron. Generally, the silicon nitride powder ranges in mean surface area from about 2 square meters per gram to about 50 square meters per gram which is equivalent to about 0.94 micron to 0.04 micron, respectively, and preferably, the silicon nitride powder ranges in mean surface area from about 5 square meters per gram to about 25 square meters per gram which is equivalent to about 0.38 micron to about 0.08 micron, respectively.

The silicon nitride and beryllium additive powders can be admixed by a number of techniques such as, for example, ball milling or vibratory milling, to produce a homogeneous dispersion. The more uniform the dispersion, the more uniform is the microstructure and properties of the resulting dense hot-pressed body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing mediums include hydrocarbons such as benzene and chlorinated hydrocarbons. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained just above the boiling point of the liquid mixing medium.

The present powder dispersion is hot-pressed in an atmosphere of nitrogen which can range from atmospheric pressure to superatmospheric pressure, generally, up to about 5 atmospheres. The nitrogen inhibits or prevents significant thermal decomposition of the silicon nitride and thereby promotes its densification. In the present invention no significant weight loss due to the thermal decomposition of silicon nitride occurs. Gases such as argon or helium are not useful at the lower pressing temperatures, i.e. below about 1750° C. because they are too expensive for commercial use, and at temperatures close to or above 1750° C. they would not prevent thermal decomposition of silicon nitride.

Thermal decomposition of silicon nitride may possibly occur during the hot-pressing cycle to leave elemental silicon in the product. By a significant thermal decomposition of the silicon nitride herein it is meant a decomposition which produces elemental silicon in the hot-pressed product in an amount higher than about 2% by volume of the product. This can be monitored by microstructural observation of polished sections of the hot-pressed body.

The nitrogen gas used should be free of oxygen or substantially free of oxygen so that there is no significant oxygen pickup by the body being hot-pressed.

In carrying out the present process, the particulate mixture or dispersion is hot-pressed, i.e. densified, at a pressure and temperature and for a sufficient period of time to produce the present dense product. Specifically, the hot-pressing temperature ranges from about 1600° C. to about 1850° C. and applied pressure at such pressing temperature ranges from about 2000 psi to a maximum pressure which is limited by available pressing equipment. Thus, for solid graphite dies the upper limit is about 5000 psi and for graphite fiber-wound dies the upper limit is about 15,000 psi. The specific temperature and pressure used in determinable empirically and depends largely on the powder being pressed and the specific dense product desired. The higher the pressure, the lower is the pressing temperature required, but as a In the present invention, unless otherwise stated, the density of the hot-pressed body is given as a fractional density of the theoretical density of silicon nitride (3.18 g/cc).

The invention is further illustrated by the following examples wherein the procedure was as follows unless otherwise stated:

In-house silicon nitride powder was prepared for use in Examples 1, 3 and 4 as disclosed in copending Ser. No. 756,241 filed of even date herewith. Specifically, this powder was prepared in a furnace which included an open-ended fused silica reaction tube 3.8 cm. diameter placed in a tube furnace, i.e. except for its open-end portions the reaction tube was located inside the furnace, and connected on the downstream end to a coaxial electrostatic separator operated between 5 and 15 KV and 0.2 to 0.5 mA. The outlet of the separator was terminated with a bubbler filled with an organic solvent which ensured positive pressure in the system. A liquid manometer indicated gas pressure in the reaction tube. For each run the reaction tube was heated at a length of 15 inches to a maximum temperature which was 600° C. for the silicon nitride powder used in Examples 1 and 4 and which was 850° C. for the powder used in Example 3, the system purged with purified argon and the reactants were then metered in. Electronic grade silane and anhydrous ammonia dried further by passing the gas through a column of calcium nitride were measured in separately by coaxial inlets into the reaction tube. The gas flow rates were adjusted to 0.2 standard cubic feet per hour (SCFPH) of $SiH_4$ and 3.5 SCFPH of $NH_3$. A voluminous, light-tan powder was collected in the downstream end of the reaction tube and in the attached electrostatic separator. After four hours the gas flow of reactants was discontinued and the system was left to cool off to room temperature under a flow of 0.5 SCFPH of purified argon, and the powder was then recovered from the reactor and separator. The product was a light-tan powder, amorphous to X-rays, had wide absorption bands in its I.R. spectra centered around 10.5 and 21.0 microns (characteristic for silicon-nitrogen bonding), and contained no metals above 50 ppm determined by emission spectroscopy.

Surface area measurements were made by a low temperature nitrogen absorption technique.

Oxygen content was determined by neutron activation analysis.

Powder density was determined by a helium Null-Pycnometer.

Before each hot-pressing run the system was evacuated and back-filled with nitrogen gas and during the hot-pressing run and subsequent furnace-cooling nitrogen was flowing through the system at a flow rate of one cubic foot per hour.

At the end of each hot-pressing run, the power to the induction coils was turned off, the load removed and the hot-pressed body furnace cooled to room temperature.

Liquid nitrogen labeled as "High Purity Dry Nitrogen" having less than 10 parts per million oxygen content was used as the source of nitrogen gas for the furnace atmosphere.

Density of the hot-pressed product was determined by water displacement using Archimedes method.

EXAMPLE 1

The in-house silicon nitride powder used in this example had a specific surface area of 15 $m^2/g$, a powder density of 2.75 g/cc and an oxygen content of 3.12% by weight of the starting powder.

To 1 gram of the silicon nitride powder there was added 0.2g of $Be_3N_2$, i.e. 2 weight % of beryllium nitride powder which corresponds to 1 weight % of elemental beryllium based on the amount of silicon nitride, and 10 cc of benzene with 0.02 gram of paraffin added as a binder. Mixing was carried out for 15 minutes in a silicon carbide mortar and pestle in a nitrogen glove box.

After drying in a nitrogen glove box and collection, the resulting dry powder dispersion, which had an average particle size which was submicron, was loaded into a graphite die fitted with a 1 cm. diameter boron nitride insert. The faces of the graphite plungers were coated with a boron nitride slurry and dried before hot-pressing. The boron nitride material prevented reaction between the silicon nitride and graphite.

The thermal and pressure cycle for hot-pressing consisted of applying a pressure of 3.5 MPa(500 psi) at room temperature and a pressure of 55 MPa (~8000 psi) at 1100° C. There was a 1 minute hold at red heat (~800° C.) to remove the paraffin binder. The time to reach 1750° C. was about 15 minutes. After a soak time of 20 minutes at 1750° C., i.e. the hot-pressing temperature, in the nitrogen atmosphere under a pressure of 8000 psi, the power to the induction coils was turned-off, and the load removed. The boron nitride was removed from the resulting hot-pressed body by grinding before characterization.

X-ray diffraction analysis of the hot-pressed body showed that it was composed of a $\beta$-silicon nitride phase plus a trace amount of $\alpha$-silicon nitride phase; no other phases could be detected. However, observation of a polished section of the hot-pressed body by optical microscopy at high (500–1000X) magnifications showed the presence of unidentified discrete second phase particles usually less than 10 microns in size and in total amount less than 2% by volume of the body. One of the secondary phases had a high reflectivity and was probably elemental silicon; the other secondary phase is believed to be $BeSiN_2$. The residual pores were less than 5 microns in size and usually smaller than 2 microns. The $\beta$-silicon nitride grains were elongated and not longer than 5 microns, with an average grain size of about 2 microns and an average aspect ratio less than 4. The density of the hot-pressed body was measured to be 3.12g/cc, or 98% of the theoretical value of 3.18g/cc. This run, i.e. the 2 wt.% $Be_3N_2$ run, is shown in the accompanying FIGURE.

In the accompanying FIGURE all of the plotted runs were carried out in the same manner as the 2 wt.% $Be_3N_2$ run except for the amount $Be_3N_2$ used. Specifically, the control run at 0% $Be_3N_2$ produced a product with a density of 55%, at 0.5 wt.% $Be_3N_2$ (0.25 wt.% elemental Be) the product density was 92%, at 1 wt.% $Be_3N_2$ (0.5 wt.% elemental Be) the product density was 97%, at 3.5 wt.% $Be_3N_2$ (1.75 wt.% elemental Be) the product density was 83%, at 5% $Be_3N_2$ (2.5 wt.% elemental Be) the product density was approximately 76%, and at 15 wt% $Be_3N_2$ (7.5 wt.% elemental Be) the product density was 60%.

The hot-pressed product produced in those runs where the $Be_3N_2$ ranged from 0.5 wt.% to 3.5 wt.%, practical matter, temperatures below 1600° C. will not produce the present dense product. On the other hand, temperatures higher than about 1850° C. are not practical since the silicon nitride decomposes substantially in the present hot-pressing process at about 1900° C. resulting in material loss. Preferably, for best results, the hot-pressing or densification temperature ranges from about 1700° C. to about 1830° C. and the pressure ranges from about 5000 psi to about 10,000 psi. It is advantageous to use a pressure close to the maximum available because the application of such high pressure makes it possible to keep the pressing temperature low enough to control grain growth. Generally, hot-pressing in the present process is carried out at the desired temperature in a period of time ranging up to about 60 minutes, and longer periods of time usually do not provide any significant advantage except at temperatures below 1700° C. where there continues to be a conversion of $\alpha$-to the preferred $\beta$-form of silicon nitride.

The composition of the silicon nitride in the present product depends on the hot-pressing temperatures used and ranges from $\alpha$-silicon nitride alone to $\beta$-silicon nitride alone with all mixtures of the $\alpha$- and $\beta$-forms of silicon nitride falling within the range. Specifically, with hot-pressing tempratures below about 1680° C., the silicon nitride in the resulting hot-pressed product may be all of the $\alpha$-form, or it may be comprised of a major amount of the $\alpha$-form and up to about 25% by weight of the $\beta$-form, based on the total amount of silicon nitride depending on the amount of $\alpha$- which converts to the $\beta$-form, and also on the amount of the $\beta$-form initially present in the powder. At temperatures above about 1680° C. and ranging up to about 1750° C., the silicon nitride in the resulting product is always a mixture of $\alpha$- and $\beta$-form of silicon nitride. At hot-pressing temperatures above about 1750° C., the silicon nitride in the product is usually only of the $\beta$-type.

The morphology of the $\alpha$- and $\beta$-silicon nitrides in the hot-pressed product is distinguishable. Specifically, as determined by scanning electron microscopy and metallographically in combination with X-ray diffraction analysis, the grains of $\alpha$-silicon nitride are substantially equiaxed in form whereas the $\beta$-silicon nitride grains are elongated in form. The $\alpha$-grains are always less than two microns in size and normally less than 1 micron in size. Preferably, they have a grain size of 1 micron or less. The $\beta$-grain are generally less than about 5 microns in length, and for best results usually less than about 2 microns in length and have a width usually less than about 0.5 micron. The strength of the present hot-pressed product increases with increasing content of $\beta$-silicon nitride provided that such grains are less than about 10 microns in length. The $\beta$-grains are interpenetrating usually forming a network which resists fracture. At relatively high hot-pressing temperatures and for relatively long periods of hot-pressing, i.e. longer than about one hour, the $\beta$-grains may grow to a length of about 10 microns. Preferably, the present product is comprised of only the $\beta$-form of silicon nitride since it provides the most stable properties.

The hot-pressed body of the present invention has a density ranging from about 80%, and preferably from about 96% to about 100% of the theoretical density of silicon nitride. The product is comprised of silicon nitride and some form of beryllium. The beryllium is present in an amount ranging from about 0.1% by weight to about 2.0% by weight of the silicon nitride. The beryllium component of the product is detectable or determinable by techniques such as emission spectroscopy and chemical analysis.

The present hot-pressed product may also contain oxygen in some form in an amount up to about 3% by weight of the product. Preferably, for high temperature applications, the hot-pressed product contains oxygen in an amount less than about 2% by weight of the product. Oxygen content may be determined by techniques such as neutron activation analysis.

According to X-ray diffraction analysis or optical microscopy, the hot-pressed product may be single phase or polyphase. With reference to the hot-pressed product by the term single phase or primary phase it is meant herein the silicon nitride phase, i.e. the $\alpha$-form or $\beta$-form of silicon nitride and mixtures thereof. Generally, when the beryllium additive is used in amounts wherein its beryllium component is equivalent to levels up to about 0.5% by weight of elemental beryllium, the hot-pressed product is usually a single phase material. However, when the beryllium additive is used in amounts wherein its beryllium component is equivalent to levels approaching or at about 2% by weight of elemental beryllium, a secondary beryllium-containing phase may be detected, and this has been determined to be a beryllium silicon nitride phase, usually $BeSiN_2$. The beryllium silicon nitride secondary phase may be present in an amount ranging up to about 6% by volume of the hot-pressed body. This secondary phase is solid throughout the hot-pressing temperature range, i.e. at temperature ranging up to about 1850° C. in an atmosphere in which said body is inert.

In addition, if the starting powder contains free silicon, the hot-pressed body may also contain free silicon as a secondary phases, such free silicon should be present in amount less than about 2% by volume of the hot-pressed body.

The secondary phase or phases are discrete and distributed substantially uniformly thoughout the hot-pressed body. Generally, the grains of the secondary phase or phases are of about the same size or finer than the grains of the primary phase.

The presence of a glassy phase is usually determined by selective etching of the specimen and observing the pits formed by the etched out glassy phase and/or deep etching of the grain boundaries themselves. Sectioning and polishing of the present hot-pressed body and subjecting the polished surface to acid solutions containing hydrofluoric acid reveals no etching or no significant etching of the grain boundaries which signifies essentially no detectable evidence of an intergranular silicate phase at the grain boundaries.

The present hot-pressed product usually exhibits a preferred orientation of the grains in a direction perpendicular to the direction of the applied hot-pressing pressure, i.e. a preferred orientation in the plane perpendicular to the hot-pressing direction. As a result, a test bar cut perpendicular to the hot-pressing direction usually exhibits a tensile strength higher than that of a test bar cut parallel to the hot-pressing direction.

The present hot-pressed product is useful in structural applications such as components for gas turbines. Specifically, the present process can produce a hot-pressed product which retains its room temperature shape and mechanical properties at high temperatures making it particularly useful for high temperature structural applications which utilize simple shapes including cylinders, plates and domes.

showed substantially the same silicon nitride grain structure as was seen for the 2 wt.% $Be_3N_2$ run. However, the product produced in the 3.5 wt.% $Be_3N_2$ run showed more second phase content than that in the 2 wt.% $Be_3N_2$ run, whereas the product produced in the 0.5 wt.% $Be_3N_2$ run was found to be single phase by X-ray diffraction analysis and optical microscopy.

The shape of the curve in the accompanying FIGURE will be in part determined by the mixing procedure used in that better mixing procedures will in general give higher densities for a given composition especially for beryllium levels less than 1 weight % because it is difficult to disperse small amounts of the beryllium additive with a mortar and pestle.

EXAMPLE 2

In this example, amorphous highly pure silicon nitride powder was used which had been produced by reaction between $SiCl_4 + NH_3$. It had a specific surface area of $12.8 m^2/g$, an oxygen content of 3.0 wt.%, and its metal impurity content was less than 100 ppm. This powder was admixed with 2% by weight of $Be_3N_2$ powder based on the amount of silicon nitride. Mixing, drying and hot-pressing was carried out in the same manner as disclosed in Example 1. The resulting hot-pressed body had a density of 3.02g/cc or 95% of the theoretical density. It was composed of $\beta$-$Si_3N_4$ phase and a trace of $\alpha$-$Si_3N_4$. Except for the difference in the amount of porosity, all other microstructural features were the same as disclosed for the 2 weight % $Be_3N_2$ run disclosed in Example 1.

EXAMPLE 3

The in-house silicon nitride powder used in this example was amorphous to X-rays and had a specific surface area of $16 m^2/g$. This powder was calcined in $N_2$ at 1450° C. for 15 minutes to essentially crystallize all of the powder into $\alpha$-$Si_3N_4$. The oxygen content and specific surface area of this calcined powder were 2.06 wt.% and $10.0 m^2/g$, respectively.

35 g of this calcined, $\alpha$-$Si_3N_4$ powder was mixed at room temperature with 0.35g of $Be_3N_2$, i.e. 1 wt.% of $Be_3N_2$ powder, 25cc of a solution of 1% paraffin in benzene, 250 cc of benzene in a polyethylene jar mill containing 1/4 inch balls of $Si_3N_4$ grinding media. After mixing for 2 hours, the resulting dispersion was dried in a nitrogen glove box for 1 day. The powder mixture, which was a significantly homogeneous dispersion with an average particle size that was submicron, was collected and placed in a 2 inch diameter graphite die which was previously coated with a boron nitride slurry and dried. The faces of the die plungers were also coated with a boron nitride slurry and dried.

The powder mixture was hot-pressed at 1820° C. for 1 hour in a nitrogen atmosphere at 10,000 psi. The density of the resulting hot-pressed sample was 3.05g/cc, or 96% of the theoretical value.

X-ray diffraction analysis of the hot-pressed sample showed it to be composed of only $\beta$-$Si_3N_4$.

Observation of a polished section of the hot-pressed body by optical microscopy showed the microstructure contained a small amount of discrete secondary phase of size smaller than 5 microns.

Observation of the grains in the microstructure of the hot-pressed body by chemical etching (8 minutes in boiling $NH_4F + HNO_3$ mixture) and by scanning electron microscopy of freshly fractured surfaces reveals that the $\beta$-$Si_3N_4$ grains are elongated and have an average length of about 3 microns and an aspect ratio of about 4. It was difficult to etch most of the grain boundaries indicating no obvious detection of a glassy phase.

EXAMPLE 4

The procedure used in this example was the same as that set forth in Example 1 except that 0.5 wt.% $Be_3N_2$ powder was used and the resulting powder mixture was hot-pressed at 1700° C. for 1 hour at 8000 psi in nitrogen.

The resulting hot-pressed product had a density of 2.72g/cc, i.e. 86%. About 60% by weight was silicon nitride phase was $\beta$-form and about 40% by weight was the $\alpha$-form and grain size of both $\alpha$- and $\beta$-grains was $\leq$ 2 microns.

Electron diffraction and trasmission experiments identified the $\beta$-grains to be the elongated grains and the $\alpha$-grains to be the equiaxed grains.

All of the following cited applications are, by reference, made part of the disclosure of the present application and assigned to the assignee hereof:

In copending U.S. patent application Ser. No. 756,083 entitled "Hot Pressing Of Silicon Nitride Using Magnesium Silicide", filed of even date herewith in the names of Charles D. Greskovich and Chester R. O'Clair, there is disclosed a dense polycrystalline silicon nitride body produced by hot-pressing a particulate mixture of silicon nitride and a magnesium silicide additive.

In copending U.S. patent application Ser. No. 756,085 entitled "Sintering Of Silicon Nitride Using Be Additive", filed of even date herewith in the names of Svante Prochazka, Charles D. Greskovich, Richard J. Charles and Robert A. Giddings, the disclosed process comprises forming a particulate dispersion of silicon nitride and beryllium additive into a green body and sintering the green body at a temperature ranging from about 1900° C. to about 2200° C. in a sintering atmosphere of nitrogen at superatmospheric pressure producing a sintered body with a density ranging from about 80% to about 100%.

In copending U.S. patent application Ser. No. 756,086 entitled "Sintering Of Silicon Nitride Using Mg And Be Additives", filed of even date herewith in the names of Svante Prochazka, Charles D. Greskovich, Richard J. Charles and Robert A. Giddings, the disclosed process comprises forming a particulate dispersion of silicon nitride, magnesium additive and beryllium additive into a green body and sintering the green body at a temperature ranging from about 1800° C. to about 2200° C. in a sintering atmosphere of nitrogen at superatmospheric pressure producing a sintered body with a density ranging from about 80% to about 100%.

What is claimed is:

1. a hot pressed polycrystalline silicon nitride body having a density ranging from about 80% to about 100% of the theoretical density of silicon nitride, said body consisting essentially of silicon nitride, beryllium and oxygen, said silicon nitride ranging from the $\alpha$-form to the $\beta$-form with all mixtures of said $\alpha$- and $\beta$-forms falling within said range, said beryllium being present in an amount ranging from about 0.1% by weight to about 2.0% by weight of said silicon nitride, said oxygen being present in an amount ranging up to about 3% by weight of said body, said polycrystalline body ranging from a single phase body to one comprised of a primary phase and up to about 6% by volume of said body of a secondary solid beryllium silicon nitride phase, said body being at least substantially free of an intergranular silicate glassy phase at its grain boundaries and substantially retaining its room temperature mechanical properties at elevated temperatures ranging up to about 1400° C. in air.

2. A polycrystalline silicon nitride body according to claim 1 having a density ranging from about 96% to about 100% of the density of silicon nitride.

3. A polycrystalline silicon nitride body according to claim 1 which is a single phase body.

4. A polycrystalline silicon nitride body according to claim 1 wherein said silicon nitride is present in the $\beta$-form.

5. A polycrystalline silicon nitride body according to claim 1 wherein said beryllium is present in an amount ranging from about 0.5% to about 1.0% by weight of said silicon nitride.

* * * * *